United States Patent [19]

Avera

[11] Patent Number: 4,942,055

[45] Date of Patent: * Jul. 17, 1990

[54] GRAVITATIONALLY-STABILIZED PEANUT-CONTAINING COMPOSITION

[75] Inventor: Fitzhugh L. Avera, Alameda, Calif.

[73] Assignee: PBFB Licensing Corporation, Burnsville, Minn.

[ * ] Notice: The portion of the term of this patent subsequent to May 23, 2006 has been disclaimed.

[21] Appl. No.: 316,989

[22] Filed: Feb. 28, 1989

Related U.S. Application Data

[63] Continuation-in-part of Ser. No. 116,636, Nov. 3, 1987, Pat. No. 4,832,977, which is a continuation-in-part of Ser. No. 943,681, Dec. 18, 1986, Pat. No. 4,728,526.

[51] Int. Cl.$^5$ ............................................. A23L 1/38
[52] U.S. Cl. ................................... 426/633; 426/658
[58] Field of Search ............... 426/633, 658, 548, 804, 426/632

[56] References Cited

U.S. PATENT DOCUMENTS

| | | |
|---|---|---|
| 1,398,352 | 11/1921 | Willison . |
| 1,859,206 | 5/1932 | Heisler . |
| 2,876,107 | 3/1959 | Jucaitis et al. . |
| 2,955,040 | 10/1960 | Avera . |
| 3,140,953 | 7/1964 | Roberts . |
| 3,245,803 | 4/1966 | Baker et al. . |
| 3,278,314 | 10/1966 | Colby et al. . |
| 3,580,729 | 5/1971 | Darragh et al. . |
| 3,619,207 | 11/1971 | Dzurik . |
| 3,766,165 | 10/1973 | Rennhard . |
| 3,876,794 | 4/1975 | Rennhard . |
| 3,903,311 | 9/1975 | Bullerbeck et al. . |
| 3,971,857 | 7/1957 | Fruda et al. . |
| 3,978,246 | 8/1976 | Chozianin et al. . |
| 4,042,714 | 8/1977 | Torres . |
| 4,152,466 | 5/1979 | Deretchin . |
| 4,401,682 | 8/1983 | Battista . |
| 4,477,482 | 10/1984 | Avera . |
| 4,631,195 | 12/1986 | Colliopoulos et al. . |

FOREIGN PATENT DOCUMENTS

| | | | |
|---|---|---|---|
| 671189 | 9/1963 | Canada | ................................. 99/176 |
| 0152455 | 9/1983 | Japan . | |

OTHER PUBLICATIONS

Pfizer Technical Information Sheet 2090 Technical Information (Mar. 1986).
Pfizer Chemical Division Sales Brochure (©1985, Pfizer): Pfizer Polydextrose for the Market That's Shaping Up.
Pfizer Technical Data Sheets (1981–1982) re: Available Polydextrose Formulations.
Pfizer Chemical Division, ©1983, Technical Information: Polydextrose.
Reprint from Food Engineering (Jul. 1986).
Reprint from Food Processing (Aug. 1986).

*Primary Examiner*—Carolyn Paden
*Attorney, Agent, or Firm*—Merchant, Gould, Smith, Edell, Welter & Schmidt

[57] ABSTRACT

Peanut-containing compositions and other proteinaceous plant solids and fat-containing compositions are provided which are gravitationally-stabilized with water-soluble, edible polydextrose which includes polycarboxylic acid cross-linking agents dissolved in water and acts to prevent or inhibit oil separation from the predominantly hydrophilic proteinaceous solids of the compositions. The polydextrose is dissolved in water. The present compositions are preferably pumpable at 60° C. and solid or semi-solid at 20° C.

28 Claims, No Drawings

GRAVITATIONALLY-STABILIZED PEANUT-CONTAINING COMPOSITION

CROSS-REFERENCE TO RELATED APPLICATIONS

This application is a continuation-in-part of co-pending application Ser. No. 116,636, filed Nov. 3, 1987 now U.S. Pat. No. 4,832,977 which is a continuation-in-part of U.S. Patent Application Ser. No. 943,681, filed Dec. 18, 1986 and now issued as U.S. Pat. No. 4,728,526.

FIELD OF THE INVENTION

The present invention relates to gravitationally-stabilized food compositions containing peanuts, and other proteinaceous plant solids such as other nuts, legumes and the like.

BACKGROUND OF THE INVENTION

The manufacture of flavoring compositions for food products has been an important industry for many years. Natural flavors derived from vegetables, fruits, nuts, spices, and other sources have been items of commerce which are combined with other foods to provide a wide variety of tastes and textures for the consumer.

One highly desirable flavor is the flavor of fresh roasted peanuts. The peanut, or groundnut as it is often called outside the United States, is the seed or fruit of the peanut plant. The present seed, which includes a pair of cotyledons, comprises a system of oil dispersed within a solid matrix. When the peanuts are ground, however, the ground or divided solids are dispersed within an oil or lipid phase. The same is true of most other nuts, legumes and the like, although some have only a single cotyledon. The fats or oils are primarily hydrophobic lipid materials which, in combination with the substantially proteinaceous solids, can provide pleasing flavor and texture in food systems. Because of their hydrophobic or lipophilic nature, however, the oil tends to separate from the predominantly hydrophilic proteinaceous solids when ground peanuts are mixed in many food systems. Other ground nut and legume products also separate in a similar manner. Therefore, the separation of hydrophobic oil and hydrophilic solids pose a significant problem which needs to be addressed in the formulation of ground peanut-containing compositions and the like.

A further problem is that, because the solids are dispersed within the oil phase, ground nut, legume, and particularly peanut products are considerably oily to the touch and do not, therefore, make particularly good finger food. Because of the oily surface characteristics of these products, they do not make a very good fill for candies or pastries either. Peanut flavored candy fillings have been made by adding tremendous amounts of sugar to provide a crystalline matrix for the oil phase, but this tends to override the peanut flavor and makes the end product too sweet for many consumers. Furthermore, it is believed that nut and legume flavors, particularly roasted peanut flavors, are significantly diminished when the solids are dispersed in the oil phase as compared to providing a solids matrix in which the oil is dispersed as is believed to occur in peanuts and other nuts and legumes in nature.

Accordingly, substantial needs exist for gravitationally-stabilized nut and peanut-containing compositions which are not significantly oily to the touch, so that they may provide a form and texture which can be used for finger foods, candy fillings, pastry fillings and the like, while providing a true nut or peanut flavor. A need also exists for gravitationally-stabilized nut and peanut-containing food products which provide a solids matrix in which the oil is dispersed similar to that provided in nature by peanuts and other nuts and legumes. Furthermore, a general need exists for gravitationally-stabilized solid or semi-solid mixtures. The ability to produce new protein rich products which are sufficiently hardened to offer nut and peanut finger foods having significant shelf stability may open markets for new products offering robust natural flavors provided by a food system which has the same general form as that of the natural system from which it is originally derived.

It will be appreciated from the foregoing that the prior art presents problems which are in need of solutions. The present invention provides solutions for these and other problems.

SUMMARY OF THE INVENTION

Accordingly, the present invention provides a gravitationally-stabilized solid or semi-solid peanut-containing composition comprising about 60–98% by weight of peanuts, about 1–10% by weight high melting point (HMP) vegetable oil, about 1–10% by weight of water-soluble, edible polydextrose, and about 0.5–8% by weight of added water. The HMP vegetable oil is solid or semi-solid at 20° C. The polydextrose includes polycarboxylic acid cross-linking agents and is dissolved in water. The composition is a gravitationally-stable solid or semi-solid mixture which is preferably a hardened nut butter. Preferably, the composition is a stabilized nut butter which is pumpable at about 60° C. and is a solid or semi-solid cake at about 20° C. The peanuts preferably comprise about 0–60% granulated peanuts and about 40–100% ground peanuts.

The present protein-containing composition comprises about 5–40% plant proteins; about 5–60% fats; about 2–40% carbohydrates; about 1–10% polydextrose; and about 0.5–8% added water. This composition is a gravitationally stabilized solid or semi-solid mixture, preferably including peanut cotyledons or cotyledon pieces.

The polydextroses employed in the present compositions are water-soluble, synthetic, edible, undigestible, dextrose polymers which are disclosed by Rennhard in U.S. Pat. Nos. 3,876,794 and 3,766,165 to be useful as dietetic bulking agents. These polymers are produced by the melt polymerization of dextrose (D-glucose) and edible dicarboxylic acid cross-linking agents. This product has been disclosed to be useful as a noncaloric bulking agent for incorporation into dietetic food compositions.

In the compositions of the present invention, however, the dissolved polydextrose is believed to interact with the proteinaceous solids to form a solid or semi-solid mixture including a bonded solids matrix within which oil is dispersed in a manner having similarity to a natural nut or peanut system. In providing this bonded solids matrix, it is believed that the polydextrose also acts to gravitationally stabilize nut and peanut-containing compositions so that lipophilic and hydrophilic components of such compositions will have eliminated or reduced tendencies to separate during storage or use. The capacity of polydextrose to gravitationally-stabilize the present compositions depends upon properties of the polydextrose when solubilized or dissolved in water. It is not believed that solid polydextrose will be effective to product the solid or semi-solid mixture of the present invention or to stabilize the lipophilic fats and predominantly hydrophilic proteinaceous solids contained therein.

The preferred embodiments of the present invention provide a superior nut-flavored fill for pastries, candies, and the like. The gravitational stabilization of the oil, which is dispersed within a proteinaceous solid matrix, is believed to provide a superior flavor because it is believed that the structural relationship between the respective constituents is more similar to the natural relationship of these constituents as found in nature in nuts, legumes and the like. Preferably, the hardened nut butters, which can contain significant percentages of peanut cotyledons and cotyledon pieces, are semi-solid or solid cake-like compositions at room temperature (or at about 20° C.), which can break apart and can in some cases crumble when broken apart. They preferably clump when pressed together. Preferably, the texture is very similar to that of a soft, dry cheese, like a soft aged cheddar cheese or a blue cheese which can be broken apart and which can crumble upon breaking. In the most preferred embodiments, the compositions of the present invention include granulated peanuts. As used herein, granulated peanuts mean broken and/or unbroken peanuts which include at least some solid portions of whole peanut cotyledon. The preferred embodiments of the present invention also include high melting point (HMP) fats or oils which are non-liquid at room temperature or about 20° C. These oils include tropical oils such as coconut oils, palm oils, and the like, hydrogenated and partially hydrogenated vegetables oils, high melting point oils containing large amounts of stearines or behenic acid such as Fix-X ® (Procter & Gamble Co., Cincinnati, Ohio), which is derived from rape seed oil, and the like.

It is believed that the problem of achieving improved gravitational stability in a peanut-containing food system having hydrophilic as well as lipophilic phases is believed to be created by the fact that these phases usually seek to present a dineric interface wherein the hydrophilic and lipophilic phases repel one another and attempt to separate. This results in gravitational instability and, ultimately, in phase separation. In the present system, it is believed that the gravitational stabilization of the peanut oil is due to both the provision of the bonded solids matrix of the predominantly hydrophilic proteinaceous solids connected by the polymeric polydextrose strands which are solubilized in water and a bonded oil matrix provided by high melting point oils which are solid or semi-solid at room temperature (or at about 20° C.). These matrices, in turn, entrap the lipophilic fats, such as the peanut oils, nut oils and the like. It will be appreciated that these same qualities will also be present in other embodiments comprising components from plants other than peanuts and flavors from sources other than peanuts.

The above described features and advantages along with various other advantages and features of novelty are pointed out with particularity in the claims of the present application and are further described in the Detailed Description which follows.

DETAILED DESCRIPTION OF THE INVENTION

The compositions of the present invention comprise food materials such as ground peanuts, nuts or legumes, which contain proteinaceous solids and fats, and an effective, gravitationally-stabilizing amount of an aqueous solution of an edible, undigestible polydextrose. Included among these compositions are hardened nut butters which include solid nuts, and pieces thereof such as peanut cotyledons and cotyledon pieces.

Peanuts, peanut cotyledons, cotyledon pieces or fragments, and ground, roasted and/or blanched peanuts are articles of commerce and are commonly available commodity products. Preferred peanut ingredients are ground roasted peanuts, roasted peanut cotyledons or cotyledon pieces, and most preferred peanut ingredients are ground roasted blanched peanuts for reasons of optimal flavor, texture and appearance, and blanched and roasted peanut cotyledons or cotyledon pieces. All of these products are preferably used with essentially all of their peanut oil. Peanuts generally comprise about 40–50% peanut oil and about 50–60% proteinaceous peanut solids including about 20–35% protein. Ground roasted peanuts without peanut skins generally contain about 40–60% fats, about 20–35% protein, about 0.5–5% water, about 1–4% ash, and about 15–20% carbohydrates including about 1–4% of the total fiber. Preferred ground roasted peanuts contain 50.2% fat, 27.3% protein, 18.2% carbohydrates, 2.4% ash, and 1.8% water. It is possible to make the equivalent of the ground peanuts used in the present invention by adding oil to extracted peanut meal or proteinaceous peanut solids, but it is thought that this can result in substantial flavor loss and is not, therefore, a preferred ingredient for incorporation in the compositions of the present invention, although it is provided for, and is within the scope of the present invention.

The peanut compositions of the present invention may be made using edible proteinaceous plant solids from other plant materials, preferably nuts or legumes, as substitutes for the proteinaceous peanut solids from peanuts. Furthermore, various fats or lipid materials from various sources, including natural and synthetic edible fatty materials may be substituted for peanut oils which are inherent in ground peanuts. Edible fats or fatty materials are preferably derived from flower seeds, such as sesame seeds, safflower seeds, sunflower seeds and the like, nuts and legumes. Decorticated (dehulled), toasted sesame seeds having less than about 2% moisture content generally contain about 45–65% fat, about 10–30% protein, about 10–30% carbohydrates, and about 2–8% ash. Preferred decorticated, toasted sesame seeds having about 1.9% moisture content contain about 55.4% fat, 18.9% protein, 18.3% carbohydrates, and 5.5% ash.

Other edible fats or fat-like materials useful in the present compositions include non-caloric or reduced calorie fats, such as blanched chain fatty acid triglycerides, triglycerol ethers, polycarboxylic acid esters, sucrose polyethers, neopentyl alcohol esters, silicone oils/siloxanes, and dicarboxylic acid esters. Other useful fats are medium chained triglycerides, highly esterified polyglycerol esters, acetin fats, plant sterol esters, polyoxyethylene esters, jojoba esters, mono-diglycerides of fatty acids, and monodiglycerides of short-chain dibasic acids. Sources for fats include all appropriate food sources normally used to produce food fats. Among these sources are seeds such as grape seed, sesame seed, sunflower seed, safflower seed, corn, and the like, various nuts, coconut, and various legumes. Sources for oil include all of the oil-bearing seeds, nuts and legumes disclosed below as sources for proteinaceous plant solids. Fat-like materials useful in the present invention also include sugar fatty-acid polyesters or sugar alcohol fatty-acid polyesters preferably having at least four fatty-acid ester groups, with each fatty-acid preferably having 8-22 carbon atoms (i.e. Olestra®, which is being developed by the Proctor & Gamble Co., Cincinnati, Ohio). Such polyesters and their use in conventional food products have been disclosed by Mattson et al. (U.S. Pat. No. 3,600,186), the disclosure of which is incorporated herein by reference.

Sources for edible proteinaceous plant solids which may be substituted for proteinaceous peanut solids in the present invention can include cashews, pistachio nuts, walnuts, coconut meal, Brazil nuts, almonds, hazel nuts, Macadamia nuts, pecans, hickory nuts, sesame seeds, grape seeds, sunflower seeds, safflower seeds, soybeans, acorns, locust beans, beech nuts, chestnuts, sal-nuts (ginkgo), hackberries, guiana-nut, wingnut, beans generally, and the like. It will be appreciated that large percentages of edible proteinaceous plant solids from these plant materials may be substituted for proteinaceous peanut solids in the peanut compositions of the present invention. Furthermore, it will be appreciated that the various oils which are commonly used in food products, some of which are listed herein, may be substituted for peanut oils in the present peanut-containing compositions. In addition, it will be appreciated that, although the present invention is directed primarily toward gravitationally-stabilized peanut-containing compositions, the subject matter of the present invention also includes gravitationally-stabilized compositions containing a wide variety of edible proteinaceous plant solids and a wide variety of edible fats from various sources, including plant fats and synthetic fats as disclosed hereinabove. The present invention is by no means limited to the production of solid or semi-solid peanut-containing compositions, but rather includes gravitationally-stabilized compositions containing a wide variety of edible plant materials which mix proteinaceous plant solids with fats. The applicants have discovered that aqueous polydextrose can be used to gravitationally stabilize all such products and to produce solid or semisolid nut butters from these materials.

The present solid or semi-solid gravitationally-stabilized nut compositions or hardened nut butters, preferably contain about 0.2-20, more preferably about 1-10% by weight of high melting point high melting point (HMP) edible oils, preferably vegetable oils, which are solid or semi-solid at a temperature of about 20° C. Such oils include coconut oil, palm oil, or the like, hardened edible oils such as hydrogenated oils, partially hydrogenated oils, and the like which have melting points of greater than about 20° C.

Polydextrose is an edible but undigestible synthetic dextrose polymer which has been used as a non-caloric bulking agent in dietetic food compositions. Polydextroses useful in the present composition are disclosed in U.S. Patent Nos. 3,766,165 and 3,876,794 which are incorporated herein by reference. These non-nutritive carbohydrate substitutes are prepared by polycondensation or melt polymerization of dextrose in the presence of edible polycarboxylic acid cross-linking agents under conditions of reduced pressure. Optionally, polyol plasticizers such as sorbitol, glycerol, mannitol or the like, may be added to the reaction mixture to produce less rigid polymers of lower viscosity.

In general, useful polydextroses can be considered to be randomly-bonded condensation polymers of D-glucose (dextrose) which incorporate about 0.5-10 mole percent of polycarboxylic acid esters and about 5-20% by weight of a food-acceptable polyol in addition to the dextrose. It will be appreciated that other monosaccharides, such as galactose, mannose or other hexoses; maltose or other disaccharides; or mixtures thereof, may be substituted for dextrose in preparing this polycondensation product, so long as they do not change the nature of the product as a whole. The sugars supplied to the reaction mixture are supplied as dry anhydrides or dry hydrated solids in powder form. A wide variety of edible polycarboxylic acids may be used to cross-link the saccharide molecules, including citric acid, fumaric acid, tartaric acid, succinic acid, adipic acid, itaconic acid, malic acid and the like, or mixtures thereof. Among the food-acceptable polyol plasticizers which may be incorporated are sorbitol, glycerol, erythritol, xylitol, mannitol, galacitol, and the like, or mixtures thereof.

The melt polymerization process disclosed to be used to make the polydextroses used in the present invention involves combining the dry powdered glucose with the edible polycargoxylic acid cross-linking agent, and, optionally, the food-acceptable polyol plasticizing agent, and heating the mixture under reduced pressure, preferably below about 300 mm Hg, until the mixture melts. The molten mass is maintained at a constant temperature and pressure in the absence of water until substantial polymerization has taken place. During this process, the polycarboxylic acids cross-link the glucose moieties to produce a variety of randomly-bonded polyglucose polymers, wherein the 1-6 linkage predominates. The polyglucose molecules can be formed in a wide variety of molecular weight ranges, but typically exhibit a number average molecular weight of about 1,500-18,000.

When copolymerized with the dextrose and the polycarboxylic acid, the polyol plasticizers partially replace the dextrose moieties, and are integrally incorporated into the polymeric chains.

Three preferred forms of polydextrose, any of which may be used in the present invention, either alone or in combination, are available from Pfizer Chemical Division, N.Y., N.Y. These products are Polydextrose (S6810), Polydextrose Type N (70% solution) (S6811), and Polydextrose K. All three of these products are polycondensation products of dextrose, sorbitol and citric acid. Polydextrose S6810 is a water-soluble, dry powder which exhibits a pH of 2.5-3.5 in aqueous solution. It does not have any flavor or odor other than its acid character. It is soluble in water up to about an 80% by weight polydextrose solids solution. Polydextrose Type N is produced as a viscous, clear aqueous solution of partially neutralized polydextrose containing about 70% by weight polydextrose solids. It is neutralized with potassium hydroxide and exhibits a pH range of about pH 5.0-6.0. Polydextrose K is a dry solid powder which has been neutralized with potassium bicarbonate. It is soluble in water up to about an 80% by weight polydextrose solids solution, and has a pH in solution of about pH 5.0-6.0. These commercially available products may contain unpolymerized edible by-products of the condensation reaction process in minor amounts.

The polydextrose must be solubilized in the aqueous phase of the present compositions in order to effectively stabilize them. Preferably, the polydextrose is solubilized in water before it is mixed with the ground, granulated and ungrounded peanuts in formulating the present compositions. A pre-formed aqueous solution of polydextrose can be used, such as Polydextrose Type N from Pfizer. When solid polydextrose is solubilized in water prior to incorporation in the present compositions, the aqueous solution can comprise about 40–80%, preferably about 50–80%, and most preferably about 60–80% polydextrose.

Sugar or carbohydrate sweeteners that can be used in making the novel peanut-containing composition of the present invention include commonly available mono- and disaccharide sweeteners, including fructose, glucose, sucrose, honey, invert sugar, and the like, or mixtures thereof. Artificial sweeteners such as L-aspartyl-L-phenylalanine methyl ester or aspartame (available as Nutrasweet TM from the G. D. Searle Co., Chicago, Ill.), and saccharin, available as an alkali metal salt such as sodium saccharin, may also be added to the compositions of the present invention. A preferred sugar sweetener comprises a mixture of invert sugar and sucrose for reasons of blendability and cost.

An effective amount of other adjuvants may also be added, such as salt (NaCl) or salt substitutes such as potassium chloride and the like, preservatives or antimicrobial agents such as benzoate and propionate salts, and the like, antioxidants such as BHA, BHT, Ascorbic Acid and the like, coloring agents approved for use in foods, such as caramel, annatto and the F.D.& C. colorants and the like, flavoring agents, flavor enhancers, flavoring adjuncts, or other ingredients included to enhance the stabilized compositions of the present invention with regard to flavor, appearance, and stability with respect to bacteria or mold, and the like. Any ingredient commonly used in food systems may be included in embodiments of the present invention. An enumeration of certain of these ingredients is presented in *Food Chemicals Codex*, 2d Ed., 1972, which is incorporated herein by reference.

The compositions of the present invention may also include preferably about 0.1–20% by weight, preferably about 0.1–15% by weight, more preferably about 0.1–10% by weight, of carbohydrate constituents approved for use in foods selected from the group consisting of bulking agents, stabilizers, suspending agents, thickeners, gelling agents, and mixtures thereof. An enumeration of certain of these ingredients is also presented in *Food Chemicals Codex*, 2d Ed., 1972. These carbohydrate constituents include glycerin, methylcellulose, carboxymethylcellulose, xanthan gum, acacia, agar, alginates, carrageenans, starch, modified food starch, guar gum, hydroxypropyl cellulose, hydroxypropyl methyl cellulose, karaya gum, propylene glycols, locust bean gum, methyl ethyl cellulose, maltodextrose pectin, polysorbates, poloxamers, edible alcohols, tragacanth, and the like. The present compositions may also include about 0.1–30% by weight, preferably about 0.1–15% by weight, more preferably about 0.1–10% by weight, of food grade polyhydric alcohol selected from the group consisting of glucose, fructose, sucrose, mannose, dextrose, sorbitol, mannitol, and the like.

The terms "hydrophobic" and "hydrophilic" are widely-used terms describing the respective natures of materials which resist dispersion in water, and materials which mix readily with water. A "hydrophobic" material generally exhibits an affinity for "lipophilic" systems. As used herein, "lipophilic" and "hydrophobic" are interchangeable terms. Each of these terms are used in a general sense and are not intended to mean that every aspect of a composition is either "hydrophilic" or "lipophilic", but rather that these compositions are generally or predominantly one or the other, and generally exhibit characteristics which are considered to be one or the other. All percentages (%) in this specification regarding aspects of the present invention, denote "% by weight", which is also denoted by "wt-%". In the case of polydextrose, weight percentages of solid polydextrose are given. The terms "aqueous polydextrose" and "dissolved polydextrose" refer to polydextrose which has been solubilized or dissolved in water. In addition, the term "aqueous system" is intended to refer to a liquid system having water as its primary solvent. When used in regard to ground, granulated and inground peanuts, the term "unextracted" means that the inherent oil in the peanuts has not been extracted, but is present in the ground peanuts. Ground peanuts inherently include peanut oil or fat and proteinaceous peanut solids which include both protein and carbohydrate components of peanuts. "Fats" mean edible fatty materials, oils and lipids of all kinds which may include fatty acids, mono-, di-, triglycerides, and the like, as well as edible fat-like fat substitutes containing fatty constituents such as fatty acids and the like. "Proteinaceous" plant or peanut "solids" are the edible plant materials which remain after they have been processed to remove fats or oils. They generally contain a substantial amount of protein and a significant amount of carbohydrate material, including fiber as well as having an ash component and some moisture content. Preferably, "proteinaceous solids" are primarily protein. As used herein, "plant protein" means edible protein material derived from plant sources, or microbial sources, or protein of a synthetic derivation patterned after protein from plant or microbial sources. As used herein, "undigestible" is intended to refer to a substance which is non-toxic, but is generally undigestible by humans and so is not nutritive thereto. "Edible" means that a person may ingest it in appropriate amounts without suffering any ill effects, but "edible" does not indicate that something is necessarily digestible. "Caloriefree" means providing essentially no dietary calories, or edible but undigestible. The term "added water" is used to designate water which has been added to or combined with other constituents, such as the ground peanuts, and it does not include water which is contained in those constituents if any water is indeed present therein. Water incorporated in "aqueous polydextrose", i.e. Type N Polydextrose (Pfizer Chemical, N.Y., N.Y.) which is about 30% by weight water, is considered to be "added water", with respect to the compositions of the present invention. A "pumpable" composition is one which may be pumped, and which flows when it is pumped, a pump-flowable composition. A "spreadable" composition is one which may be spread with a butter knife.

The present invention provides for a wide variety of gravitationally-stabilized compositions, preferably peanut-containing compositions. These compositions may contain a wide variety of constituents. They have in common the need to provide a solid or semi-solid end product including gravitationally-stabilized solids and fats.

The present invention also provides for a gravitationally-stabilized nut-containing solid or semi-solid composition comprising about 25–98, preferably about 40–98, more preferably about 60–98, even more preferably about 80–96% by weight nuts, about 0.5–20, preferably about 1.0–10% by weight of polydextrose, and about 0.1–15, preferably about 0.2–10, more preferably about 0.5–8% by weight of added water, wherein the polydextrose is preferably dissolved in the water prior to incorporation in the present composition. The composition can include about 0.1–5.0% of other edible adjuvants described hereinabove, such as sugar and/or sugar substitutes, salt or salt substitutes, edible antimicrobial agents, food coloring agents, and other desirable food additives or flavor potentiators known in the art. In preferred embodiments, the nuts included ground, granulated and unground nuts, preferably blanched and nuts peanuts including their oil. As used herein, nuts mean nuts, legumes, edible seeds and the like which have the same generally seed flesh characteristics of peanuts as described hereinabove.

The present invention also includes compositions having the following constituent formula ranges:
about 60 to 98% roasted peanuts in the form of peanut butter, ground peanuts, granulated peanuts, peanut cotyledons, cotyledon pieces, or mixtures thereof;
about 0 to 8% hydrogenated or partially hydrogenated vegetable oil;
about 0 to 8% high melting point vegetable oils such as coconut or palm oils or other fats which are nonliquid at 20° C.;
about 0.1 to 19% edible polydextrose;
about 0 to 8% sorbitol; and
about 0.1 to 8% added water.

The following examples list formulae for gravitationally-stabilized compositions of this kind and procedures for preparing them.

EXAMPLE 1

Formula:

70.9% peanut butter (Skippy ® Creamy Peanut Butter, COC, Inc.).
12.6% blanched and roasted peanut cotyledons and cotyledon pieces.
2.8% hydrogenated or partially hydrogenated vegetable oil which is solid or semi-solid at 20° C.
0.7% salt (sodium chloride).
9.1% edible polydextrose (Type K from Pfizer, Inc.).
3.9% added water.

Procedure:

(a) A commercial peanut butter (Skippy ® Creamy Peanut Butter, CPC, Inc.) is slowly warmed to 66° C. and mixed with peanut cotyledons and cotyledon pieces.
(b) Hydrogenated or partially hydrogenated vegetable oil is heated to liquid form and slowly added to this mixture during mixing.
(c) The polydextrose is dissolved in the water component and then slowly added to the resulting mixture while mixing. The mixing is continued until there is no longer an observable increase in viscosity upon continued mixing.
(d) The resulting mixture is packaged and then allowed to solidify as it cools to room temperature.

EXAMPLE 2

Formula:

87% standard commercial stabilized chunky style peanut butter (Skaggs Alpha Beta ® Chunky Peanut Butter, Alpha Beta Corp.);
9.1% edible polydextrose (Type K from Pfizer, Inc.); and
3.9% added water.

Procedure:

(a) The chunky style stabilized peanut butter is warmed until easily mixed.
(b) 9.1% edible polydextrose is dissolved in the 3.9% water component.
(c) The result of (b) is slowly added while mixing to (a) and mixing is continued until there is no longer an observable increase in viscosity.
(d) The resulting mixture is packaged and allowed to solidify as it cools to room temperature.

EXAMPLE 3

Formula:

76.5% standard commercial peanut butter stabilized to prevent oil separation (Skippy ® Creamy Peanut Butter CPC, Inc.);
13.5% roasted and blanched peanut cotyledons and cotyledon pieces;
7.0% edible polydextrose (Type K from Pfizer, Inc.); and
3.0% added water.

Procedure:

(a) The stabilized peanut butter and peanut cotyledons and cotyledon pieces are mixed at a temperature warm enough to allow adequate mixing.
(b) The edible polydextrose is dissolved in the water.
(c) The dissolved polydextrose is showed added to the mixture resulting in step (a) while mixing is continued.
(d) The mixing is continued until there is no longer an observable increase in viscosity.
(e) The resulting mixture is packaged and allowed to solidify as it cools to room temperature.

EXAMPLE 4

Formula:

74.9% standard commercial peanut butter stabilized against oil separation (Skippy ® Creamy Peanut Butter; CPC, Inc.);
13.24% roasted and blanched peanut cotyledons or cotyledon pieces;
5.29% sorbitol;
3.01% edible polydextrose; and
3.56% added water;

Procedure:

(a) The peanut butter is heated to produce adequate fluidity and mixed with roasted and blanched peanut cotyledons and cotyledon pieces.
(b) The sorbitol and polydextrose are dissolved in the water constituent.
(c) The result of (b) is slowly added to the result of (a) while mixing is continued.
(d) The mixing is continued until there is no longer an observable increase in viscosity.
(e) The resulting mixture is packaged and allowed to solidify as it cools to room temperature.

EXAMPLE 5

Formula:

87.0% Chunky Peanut Butter (Skaggs Alpha Beta ® Extra Chunky Stabilized Peanut Butter);
13% of a 70% Aqueous Polydextrose Solution (Type N, Pfizer, Inc.)

Procedure:

(a) The peanut butter is warmed until it flows and 100 grams is put into a bowl.

(b) 15 grams of 70% Polydextrose Type N solution is added to the bowl.

(c) The contents of the bowl are mixed until there is no longer an observable increase in viscosity in the mixture as it is mixed.

(d) The mixture is then allowed to solidity as it cools to room temperature.

It will be appreciated that alternate compositions, similar to those in the foregoing examples (Examples 1–5), may be made with any of the products described in Examples I-V of the present disclosure if adequate HMP vegetable oils are added to harden the oil constituents of the composition. Preferably, these compositions are pumpable at 60° C. and solid or semi-solid at 20° C. These compositions preferably have a semi-solid or solid cake-like texture at room temperatures (or at about 20° C.) which is most like a cheese-like texture similar to that which is exemplified by a soft-dry aged cheddar cheese, and aged blue cheese, or the like which will break apart and which may crumble when broken apart.

EXAMPLE I

The following ingredients were mixed with low to medium shear mixing action in a one quart stainless steel mixing bowl at 73° C. until a homogeneous mixture resulted: 91 parts by weight of unextracted, roasted, blanched and ground peanuts; and 1 part by weight salt. To that mixture 8 parts by weight of a concentrated aqueous solution of Type N Polydextrose (Pfizer Chemical Division, NY, NY) (70% polydextrose solids) at room temperature was added. The mixing action was continued until a smooth homogeneous mixture resulted. A smooth pumpable product resulted which was gravitationally stable indefinitely under ambient storage conditions. It is estimated that this composition contains 24.8% protein, 45.7% fat, 16.6% carbohydrates, 2.2% ash, 4.0% water, including 2.3% added water, and 5.6% polydextrose.

EXAMPLE II

Into a one quart stainless steel mixing bowl is placed 41.58 parts by weight of ground, roasted, peanuts, at a temperature of 74° C. To this is added 0.42 parts by weight of salt. The mixture is then subjected to low shear mixing action until it is relatively homogeneous. Subsequently, 58 parts by weight of aqueous Type N Polydextrose (Pfizer Chemical Division, N.Y., N.Y.) is added at room temperature. Mixing is continued at low to moderate shear mixing action until a smooth, homogeneous, hydrophilic, gravitationally-stabilized peanut-flavored composition was produced.

Into a second stainless steel mixing bowl (four quart) 92% by weight ground, roasted peanuts are placed and subjected to low to medium shear mixing action at 73° C. until a homogeneous mixture results. To that mixture, 12% by weight of the hydrophilic, gravitationally-stabilized, peanut-flavored composition prepared hereinabove is added at room temperature. The mixture is then mixed continuously with low shear mixing action until a smooth, pumpable, homogeneous, lipophilic, gravitationally-stabilized, peanut-containing composition results. It is estimated that this composition contains 25.4% protein. 46.6% fat, 16.9% carbohydrates, 2.2% ash, 3.7% water including 2.1% added water, and 4.9% polydextrose.

EXAMPLE III

Decorticated or dehulled sesame seeds are toasted at 74° C. until residual moisture is reduced to less than 2% by weight. The dried and toasted sesame seeds are placed in a high shear mixer until a homogeneous mixture is produced which is similar in consistency with freshly ground roasted peanuts. Ninety-two (92) parts by weight of these ground, toasted sesame seeds are mixed with 8 parts of weight aqueous Type N Polydextrose (Pfizer Chemical, N.Y., N.Y.) at room temperature under low shear mixing conditions until a smooth, spreadable, pumpable, homogeneous, gravitationally-stabilized composition is produced. It is estimated that this composition contains 17.4% protein, 51.0% fat, 16.8% carbohydrate, 5.0% ash, 4.1% water including 2.4% added water, and 5.6% polydextrose.

EXAMPLE IV

Decorticated or dehulled sesame seeds are toasted at 74° C. until residual moisture is reduced to less than 2% by weight. The dried and toasted sesame seeds are placed in a high shear mixer until a homogeneous mixture is produced which is similar in consistency with freshly ground roasted peanuts. Sixty-four (64) parts by weight of these ground, toasted sesame seeds are mixed with 8 parts by weight aqueous Type N Polydextrose (Pfizer Chemical, N.Y., N.Y.), 14 parts by weight Maltodextrose (Maltrin ® M-100, Grain Processing Corp., Muscatine IA), and 14 parts by weight safflower oil at room temperature under low shear mixing conditions until a smooth, spreadable, homogeneous, gravitationally-stabilized sesame flavored spread composition is produced. It is estimated that this composition contains 12.1% protein, 49.5% fat, 25.6% carbohydrate, 3.5% ash, 3.6% water including 2.4% added water, and 5.6% polydextrose.

EXAMPLE V

Decorticated or dehulled sesame seeds are toasted at 74° C. until residual moisture is reduced to less than 2% by weight. The dried and toasted sesame seeds are placed in a high shear mixer until a homogeneous mixture is produced which is similar in consistency with freshly ground roasted peanuts. Twenty-four (24) parts by weight of these ground, toasted sesame seeds are mixed with 40 parts by weight ground roasted peanuts, 8 parts by weight aqueous Type N Polydextrose (Pfizer Chemical, N.Y., N.Y.), 14 parts by weight Maltodextrose (Maltrin ® M-100, Grain Processing Corp., Muscatine IA), and 14 parts by weight safflower oil at room temperature under low shear mixing conditions until a smooth, spreadable, homogeneous, gravitationally-stabilized sesame flavored spread composition is produced. It is estimated that this composition contains 15.4% protein, 474.% fat, 25.6% carbohydrate, 2.2% ash, 3.6% water including 2.4% added water, and 5.6% polydextrose.

The invention has been described with reference to various specific and preferred embodiments and techniques. However, it should be understood that many variations and modifications may be made while remaining within the spirit and scope of the present invention.

What is claimed is:

1. A gravitationally-stabilized peanut-containing solid or semi-solid composition comprising:
   (a) about 60–98% by weight of peanuts;
   (b) about 1–10% by weight high melting point (HMP) vegetable oil, said HMP vegetable oil being solid or semi-solid at 20° C.;
   (c) about 1–10% by weight of water-soluble, edible polydextrose; and
   (d) about 0.5–8% by weight of added water; wherein said polydextrose includes polycarboxylic acid cross-linking agents, wherein said polydextrose is dissolved in said water, and wherein said composition is a gravitationally-stabilized solid or semi-solid mixture at a temperature of about 20° C.

2. The composition of claim 1, said peanuts including about 0–60% granulated peanuts including roasted or blanched, whole or broken, peanut cotyledons; and about 40–100% roasted or blanched ground peanuts.

3. The composition of claim 2 wherein said composition is a stabilized nut butter which is pumpable at a temperature of about 60° C. and is a solid or semi-solid cake at a temperature of about 20° C.

4. The composition of claim 1 wherein said composition further comprises about 0.1–10% by weight of edible adjuvants, such as sugar, sugar substitutes, salt, salt substitutes, preservatives, antioxidants, coloring agents, flavoring agents, flavoring adjuncts, flavor enhancers, or mixtures thereof.

5. The composition of claim 1 wherein the polydextrose is a water-soluble, cross-linked, polydextrose, wherein the polydextrose has a number average molecular weight about 1,500–18,000.

6. The composition of claim 1 including about 0.1–60% by weight of edible proteinaceous plant solids, said plant solids including plant solids derived from seeds, nuts or legumes other than peanuts, or mixtures thereof.

7. The composition of claim 1 including a total of about 0.1–60% by weight of edible fats.

8. The composition of claim 7, said edible fats including natural or chemically-modified oils derived from plant sources, wherein said oils are non-liquid at 20° C.

9. The composition of claim 7 including edible fats derived from plants sources other than peanuts selected from the group consisting of seeds, nuts and legumes.

10. The composition of claim 7 including synthetic sugar-fatty acid polyesters in the place of a portion or all of said fats.

11. The composition of claim 1 including about 0.1–20% by weight of carbohydrate constituents approved for use in foods selected from the group consisting of bulking agents, stabilizers, suspending agents, thickeners, gelling agents, and mixtures thereof.

12. The composition of claim 11, said carbohydrate constituents including constituents approved for use in foods selected from the group consisting of methylcellulose, carboxymethylcellulose, xanthan gum, acacia, agar, alginates, carrageenans, starch, modified food starch, guar gum, hydroxypropyl cellulose, hydroxypropyl methyl cellulose, karaya gum, locust bean gum, methyl ethyl cellulose, maltodextrose, pectin, tragacanth, and mixtures thereof.

13. The composition of claim 1 including about 0.1–30% by weight of foods grade polyhydric alcohol selected from the group consisting of glucose, fructose, sucrose, mannose, dextrose, sorbitol, mannitol, invert sugar and mixtures thereof.

14. A gravitationally-stable protein-containing composition comprising:
   (a) about 5–40% by weight of plant proteins;
   (b) about 5–60% by weight fats;
   (c) about 2–40% by weight carbohydrates;
   (d) about 1–10% by weight polydextrose; and
   (e) about 0.5–8% by weight added water;
wherein said composition is a gravitationally-stable mixture, wherein said polydextrose includes polycarboxylic acid cross-linking agents, and wherein said polydextrose is dissolved in said water.

15. The composition is claim 14, wherein said composition is a stabilized nut butter which is pumpable at a temperature of about 60° C. and is a solid or semi-solid cake at a temperature of about 20° C.

16. The composition of claim 15 wherein the polydextrose is a water-soluble, cross-linked, polydextrose, wherein the polydextrose has a number average molecular weight about 1,500–18,000.

17. The composition of claim 16 wherein said proteins include proteins from nut or legume sources, or mixtures thereof; and wherein said fats include fats from plant sources.

18. The composition of claim 17 wherein said composition includes about 25–98% of ground or granulated nuts or legumes, or mixtures thereof, wherein said nuts or legumes contain a certain amount of said proteins, fats and carbohydrates.

19. The composition of claim 18 wherein said proteins include peanut proteins.

20. The composition of claim 19 wherein said fats include fats from peanuts.

21. The composition of claim 20 wherein said carbohydrates include sugars selected from the group consisting of glucose, fructose, sucrose, mannose, dextrose, sorbitol, mannitol, invert sugar, and mixtures thereof.

22. The composition of claim 20 wherein said carbohydrates include constituents approved for use in foods selected from the group consisting of bulking agents, stabilizers, suspending agents, thickeners, and gelling agents.

23. The composition of claim 17 wherein said fats include natural or chemically-modified oils from plant sources, wherein said oils are non-liquid at 20° C.

24. A gravitationally-stabilized nut-containing solid or semi-solid composition comprising:
   (a) about 25–98% by weight of nuts, said nuts including peanuts, other nuts and the legumes and mixtures thereof;
   (b) about 1–10% by weight of high melting point (HMP) vegetable oil, said HMP vegetable oil being solid or semi-solid at 20° C.;
   (c) about 1–10% by weight of water-soluble, edible polydextrose; and
   (d) about 0.5–8% by weight of added water; wherein said polydextrose includes polycarboxylic acid cross-linking agents, wherein said polydextrose is dissolved in said water, and wherein said composition is a gravitationally-stabilized solid or semi-solid mixture at a temperature of about 20° C.

25. The composition of claim 24, said nut including about 0–60% granulated nuts and about 40–100% ground nuts.

26. The composition of claim 25 wherein said composition is a stabilized nut butter which is pumpable at a temperature of about 60° C. and is a solid or semi-solid cake at a temperature of about 20° C.

27. The composition of claim 24 wherein the polydextrose is a water-soluble, cross-linked, polydextrose, wherein the polydextrose has a number average molecular weight of about 1500–18,000.

28. The composition of claim 24 wherein said nuts are roasted or blanched peanuts, and wherein said peanuts include about 0–60% granulated peanuts and about 40–100% roasted or blanched ground peanuts.

* * * * *